United States Patent [19]

Wölfges

[11] Patent Number: 4,548,233

[45] Date of Patent: Oct. 22, 1985

[54] ELECTRICALLY CONTROLLED PRESSURE RELIEF VALVE INCLUDING A HYDRAULIC BIAS

[75] Inventor: Hans Wölfges, Lohr, Fed. Rep. of Germany

[73] Assignee: Mannesmann Rexroth GmbH, Fed. Rep. of Germany

[21] Appl. No.: 600,842

[22] Filed: Apr. 16, 1984

[30] Foreign Application Priority Data

Apr. 27, 1983 [DE] Fed. Rep. of Germany ........ 3315222

[51] Int. Cl.⁴ ............................................. F16K 17/06
[52] U.S. Cl. ..................................................... 137/529
[58] Field of Search ............. 137/529, 494, 496, 514.7

[56] References Cited

U.S. PATENT DOCUMENTS

| 3,791,408 | 2/1974 | Saitou et al. | 137/529 |
| 4,063,594 | 12/1977 | Canterbury | 137/529 X |
| 4,386,626 | 6/1983 | Hehl | 137/529 |

FOREIGN PATENT DOCUMENTS

| 1032052 | 6/1958 | Fed. Rep. of Germany. |
| 1800524 | 5/1970 | Fed. Rep. of Germany ...... 137/529 |
| 2133316 | 1/1973 | Fed. Rep. of Germany. |
| 2701580 | 7/1978 | Fed. Rep. of Germany. |
| 2916172 | 10/1980 | Fed. Rep. of Germany. |
| 3125143 | 1/1983 | Fed. Rep. of Germany. |
| 1486256 | 9/1977 | United Kingdom ................ 137/529 |

OTHER PUBLICATIONS

"Olhydraulik und Pneumatik", No. 21, (1977), pp. 722-724, 727-729.

*Primary Examiner*—Martin P. Schwadron
*Assistant Examiner*—Stephen M. Hepperle
*Attorney, Agent, or Firm*—Harness, Dickey & Pierce

[57] ABSTRACT

The invention relates to pressure relief valves which spring bias is controlled by a proportional magnet. The force applied by the proportional magnet is increased by an additional hydraulic pressure force which acts on the spring. There is the advantage of decreasing the size of the proportional magnet and/or increasing the flow capacity of the valve.

6 Claims, 2 Drawing Figures

ELECTRICALLY CONTROLLED PRESSURE RELIEF VALVE INCLUDING A HYDRAULIC BIAS

FIELD OF THE INVENTION

The present invention relates to a pressure relief valve comprising a closing element to which the system pressure is applied in a sense to open said element and which is engaged by a spring in a sense to close the element, wherein the bias force of said spring is adjusted by the proportional magnet, having an armature which acts on said spring via an actuating element and wherein the spring retaining chamber is connected to a reservoir.

BACKGROUND OF THE INVENTION

Pressure relief valves electrically adjusted by a proportional magnet are widely known in the art. The spring urging the closing element of the valve on the valve seat is biased by the force of the proportional magnet. Thereagainst the system pressure acts on the closing element in a sense to lift it off the valve seat. Since the maximum magnet force produced by a proportional magnet is limited, the diameter of the valve seat must be chosen to be relatively small when high system pressures have to be controlled. For example, a magnet having a cross section of 60 times 60 mm exercises a maximum force of 16 kp. Up to a pressure of 315 bar to be controlled, the magnet allows a diameter of 2.3 mm for the valve seat.

Furthermore, the size of the valve is relatively large due to the large dimensions for the magnet. Moreover, the flow cross section between the port leading to the system pressure and the return port to the reservoir is very small.

SUMMARY OF THE INVENTION

An object of the present invention is to improve a pressure relief valve which is electrically controlled to allow for larger flow capacities. Another object is to provide a valve having smaller dimensions.

The present invention provides for a pressure relief valve in which the system pressure is applied to the inner space of the proportional magnet, wherein the system pressure acts on opposite faces of the armature which delivers a force acting to increase the bias force of the spring and in which a seal is provided between the spring retaining chamber and the inner space of the proportional magnet.

In another aspect of the present invention, the actuating element of the proportional magnet defines a piston, wherein the system pressure is applied to the piston face opposite the spring retaining chamber and wherein a seal is provided between the spring retaining chamber and the piston face opposite the spring retaining chamber.

According to the present invention, the force of the proportional magnet is increased by a hydraulic pressure force which is proportional to the system pressure. Thus the bias force of the spring is hydraulically increased so that the flow cross section of the valve can be correspondingly enlarged. Possibly the size of the proportional magnet and of the valve may be decreased.

To produce the hydraulic force of addition, the system pressure is applied to the inner space of the proportional magnet. According to a first embodiment, the armature of the proportional magnet including the actuating element secured thereto defines a piston, whereas in a second embodiment, the system pressure is applied directly to an additional piston. Also in this embodiment the system pressure is applied to the inner space of the proportional magnet to obtain a complete pressure balance of the armature. The system pressure prevailing in the inner space of the proportional magnet allows this space to fill sufficiently with pressure medium independent of the mounting position of the magnet. Thus the control characteristic of the pressure relief valve is stabilized.

DETAILED DESCRIPTION

Figure 1:
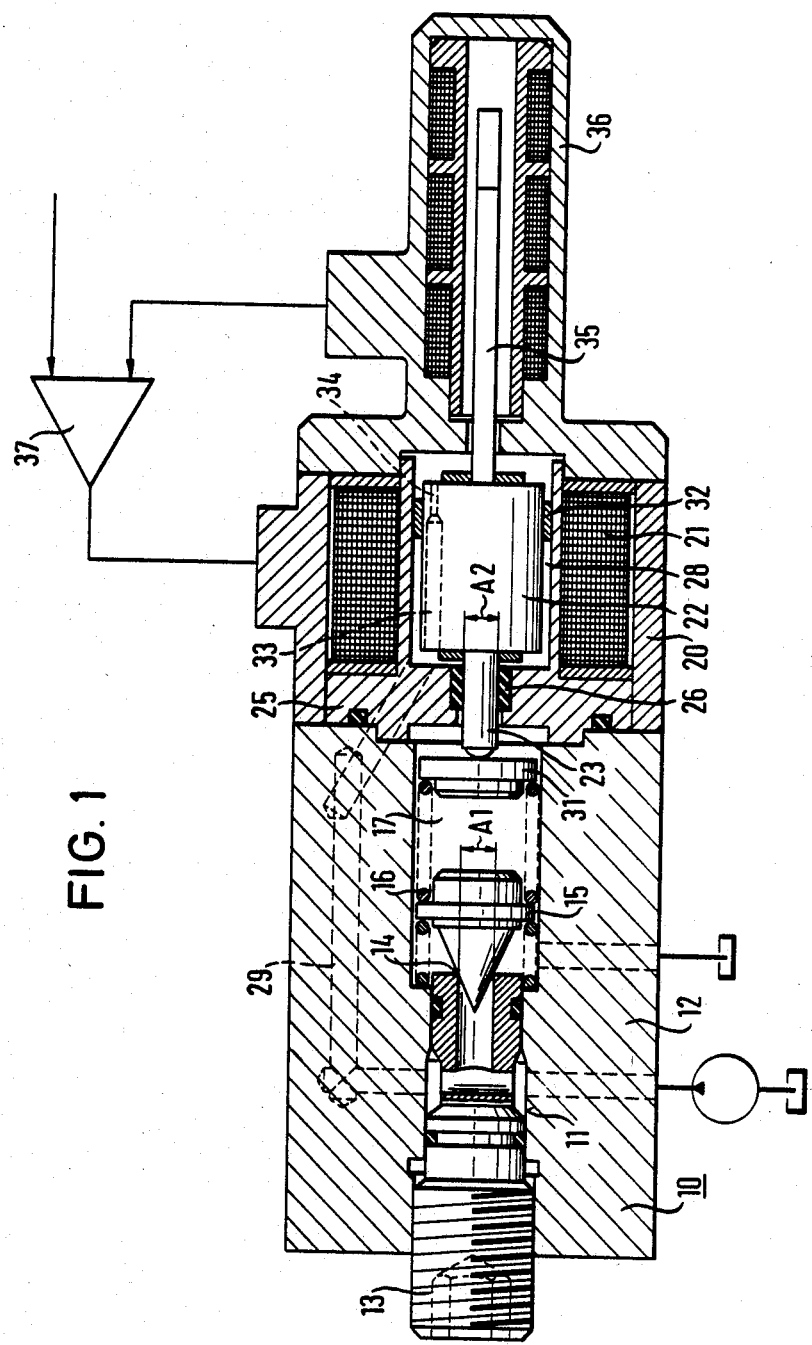
FIG. 1 is a section through a pressure relief valve according to a first embodiment of the invention and FIG. 2 is a section through a pressure relief valve in a second embodiment of the invention.

FIG. 1 shows a pressure relief valve 10 including a bore 11 in its housing 12, in which bore a plug member 13 is inserted having a valve seat 14 to which a closing element 15 is urged by a spring 16. The spring retaining chamber 17 is connected to the reservoir. The pressure in the system acts on the closing element 15 in a sense to open it, wherein the pressure force is proportional to the area of the closing element 15 which area is determined by the diameter of the valve seat 14. This area is designated A1.

The bias force of the spring 16 which tends to close the valve body 15 is controlled by a proportional magnet 20 comprising a coil 21, an armature 22 and a plunger 23 connected to the armature 22 which plunger is slidably received in a seal 26 in the housing 25 of the proportional magnet.

The inner space 28 of the proportional magnet is connected via a passage 29 to the bore 11 of the pressure relief valve in which bore the system pressure prevails. Accordingly the system pressure is applied as well as the inner space 28 and to the armature 22. From this a pressure force results which is determined by the area A2 of the plunger 23 and which acts in addition to the magnet force of the armature 22 to control the bias force of the spring 16 via a spring retainer 31. The magnet force necessary to bias the spring 16 is determined by the difference of the areas A1 minus A2 times the system pressure in the bore 11.

The armature 22 is supported in the housing of the proportional magnet by a guiding sleeve 32. The system pressure is applied through a passage 33 in the armature to the face of the armature opposite the plunger 23. A throttle 34 is provided in the bore 33 to dampen the control movements of the armature 22. The system pressure in the inner space 28 of the magnet allows the pressure medium to fill the space independent of the mounting position, whereby the dampening action of the throttle 34 is safely provided.

The pressure force resulting from the area A2 of the plunger 23 and supporting the force of the magnet increases the force of the spring 16. This, however, results in increased friction forces: The spring 16 produces a normally directed force increasing the friction force between the plunger 23 and the seal 26. Additionally a friction force is produced by foreign particles accumulating on the seal 26 and the guiding sleeve 32. The friction forces sum up and determine the hysteresis of the valve according to which the forces necessary to displace the valve in opposite directions are different.

To reduce the hysteresis of the valve, the armature 22 is connected via a rod 35 to an inductive displacement transducer 36 which picks up the position of the armature and applies the actual position signal to a control circuit 37. The control circuit 37 produces a signal in response to the difference beteen the desired position and the actual position of the armature, which signal is fed to the coil of the proportional magnet to vary the magnetic force until the difference becomes zero. Accordingly the armature 22 is moved to a desired position independent of the friction forces whereby a predetermined bias force of the spring 16 and thus a small hysteresis are obtained.

Preferably the ratio between the maximum spring force and the maximum magnetic force is smaller than 13 to 1 to avoid very high bias forces of the spring 16 which result in a normally directed force to be taken up by the seal 26 or, respectively the bearing support and which force produces friction. A satisfactory function is obtained with the relation stated above.

Moreover, the difference of areas A1 and A2 is preferably selected such that the resulting hydraulic force is larger than half the maximum magnetic force.

Figure 2:
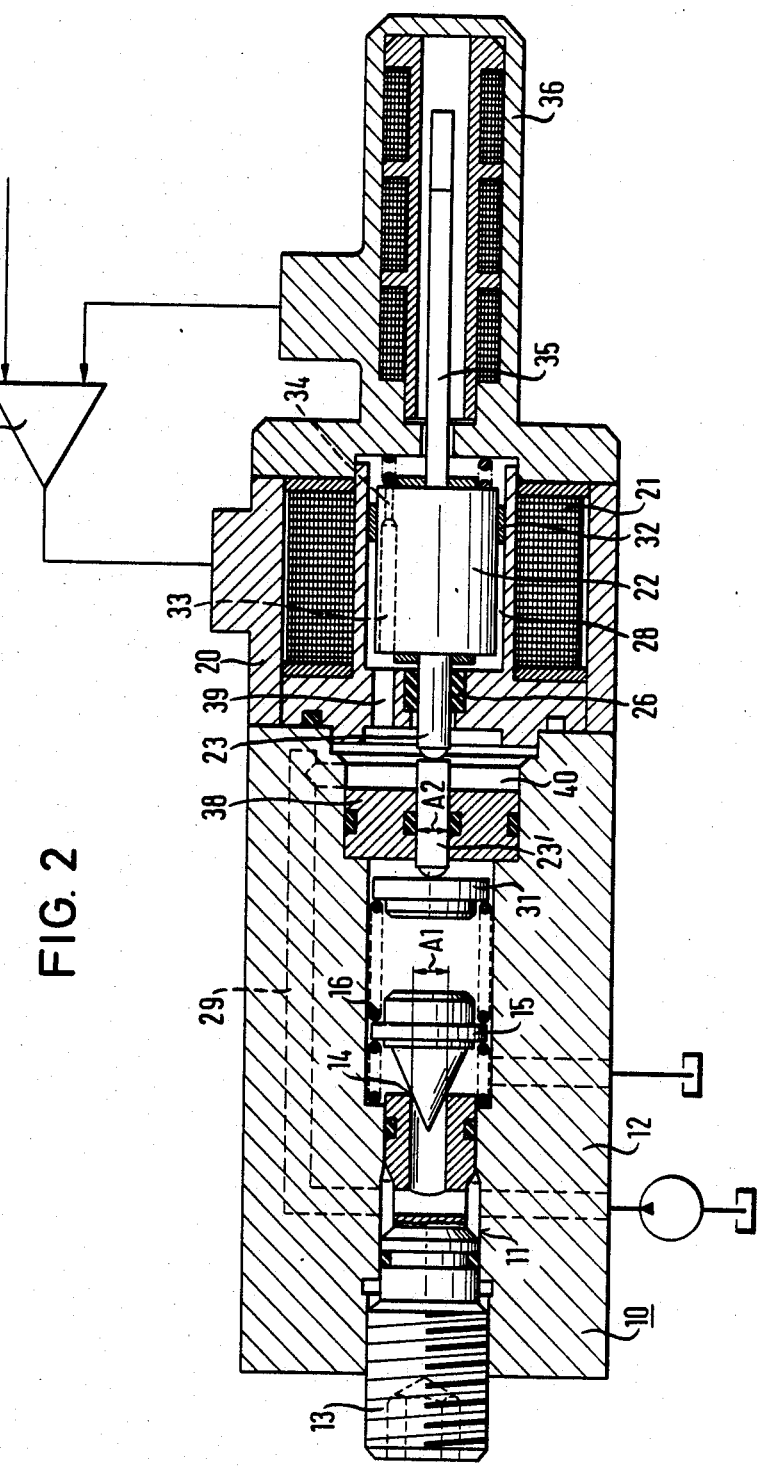

In the embodiment of FIG. 2 identical elements bear identical reference numerals. The difference with respect to FIG. 1 is that the plunger 23 of the armature 22 is separated, the forward section defining a piston 23' which front face A2 extending into the space 40 being acted upon by the system pressure through the passage 29. The piston 23' is sealingly guided in a bearing body 38. The inner space 28 of the proportional magnet 20 is again connected via a passage 39 to the system pressure. The seal 26, however, is used to merely guide the plunger 23 since the same pressure prevails on both sides of the seal 26. The force supporting action of the area A2 above specified, as well as the function of the displacement transducer 36 in combination with the control circuit 37 to compensate the friction forces are provided the same way as explained for the embodiment in FIG. 1.

What is claimed is:

1. A pressure relief valve comprising a pressure inlet, a relief line adapted to communicate with a reservoir, a valve seat interposed between said inlet and said relief line, a closing element for controlling the communication between said pressure inlet and said relief line through said valve seat, said closing element having an area to which the system pressure is applied in a direction to open said closing element, spring means biasing said closing element into engagement with said valve seat, the bias force of said spring means being controlled by a proportional magnet having an armature which acts on said spring means through an actuating element, said spring means being contained within a spring retaining chamber adapted to be connected to the reservoir, characterized by means provided for applying system pressure to the inner space of said proportional magnet and for generating a differential hydraulic force on the armature of said proportional magnet and said actuating element acting to increase the bias force of said spring means, and a seal between said spring retaining chamber and said inner space of said proportional magnet.

2. A pressure relief valve comprising a pressure inlet, a relief line adapted to communicate with a reservoir, a valve seat interposed between said inlet and said relief line, a closing element for controlling the communication between said pressure inlet and said relief line through said valve seat, said closing element having an area to which the system pressure is applied in a direction to open said closing element, spring means biasing said closing element into engagement with said valve seat, the bias force of said spring means being controlled by a proportional magnet having an armature which acts on said spring means through an actuating element, said spring means being contained within a spring retaining chamber adapted to be connected to the reservoir, characterized by means provided for applying system pressure to the inner space of said proportional magnet, said actuating element defines a piston having one face engaged with said spring means in said spring retaining chamber and means for applying system pressure to the piston face opposite said spring retaining chamber and a seal between said spring retaining chamber and said piston for sealing the piston face opposite said spring retaining chamber from said spring retaining chamber.

3. The pressure relief valve of claim 1, wherein the armature of the proportional magnet includes a longitudinal bore for balancing the pressure in the inner space of the proportional magnet.

4. The pressure relief valve of claim 1, wherein the armature is connected to a displacement transducer which is connected to a control circuit to vary the force of the proportional magnet until the difference between a desired value and the actual value for the armature position becomes zero.

5. The pressure relief valve of claim 2, wherein the armature of the proportional magnet includes a longitudinal bore for balancing the pressure in the inner space of the proportional magnet.

6. The pressure relief valve of claim 2, wherein the armature is connected to a displacement transducer which is connected to a control circuit to vary the force of the proportional magnet until the difference between a desired value and the actual value for the armature position becomes zero.

* * * * *